April 29, 1952  F. P. SHARPE  2,594,506
WHEEL ASSEMBLING MACHINE
Filed Oct. 17, 1949  10 Sheets-Sheet 1

INVENTOR.
FREDERICK P. SHARPE.
BY
ATTORNEYS.

April 29, 1952 F. P. SHARPE 2,594,506
WHEEL ASSEMBLING MACHINE
Filed Oct. 17, 1949 10 Sheets-Sheet 3

INVENTOR.
FREDERICK P. SHARPE.
BY
ATTORNEYS.

INVENTOR.
FREDERICK P. SHARPE.

April 29, 1952  F. P. SHARPE  2,594,506
WHEEL ASSEMBLING MACHINE
Filed Oct. 17, 1949  10 Sheets-Sheet 5

INVENTOR.
FREDERICK P. SHARPE.
BY
ATTORNEYS.

April 29, 1952  F. P. SHARPE  2,594,506
WHEEL ASSEMBLING MACHINE
Filed Oct. 17, 1949  10 Sheets-Sheet 6

INVENTOR.
FREDERICK P. SHARPE.
BY
ATTORNEYS.

April 29, 1952 F. P. SHARPE 2,594,506
WHEEL ASSEMBLING MACHINE
Filed Oct. 17, 1949 10 Sheets-Sheet 7

INVENTOR.
FREDERICK P. SHARPE.
BY
ATTORNEYS.

April 29, 1952     F. P. SHARPE     2,594,506
WHEEL ASSEMBLING MACHINE
Filed Oct. 17, 1949     10 Sheets-Sheet 8
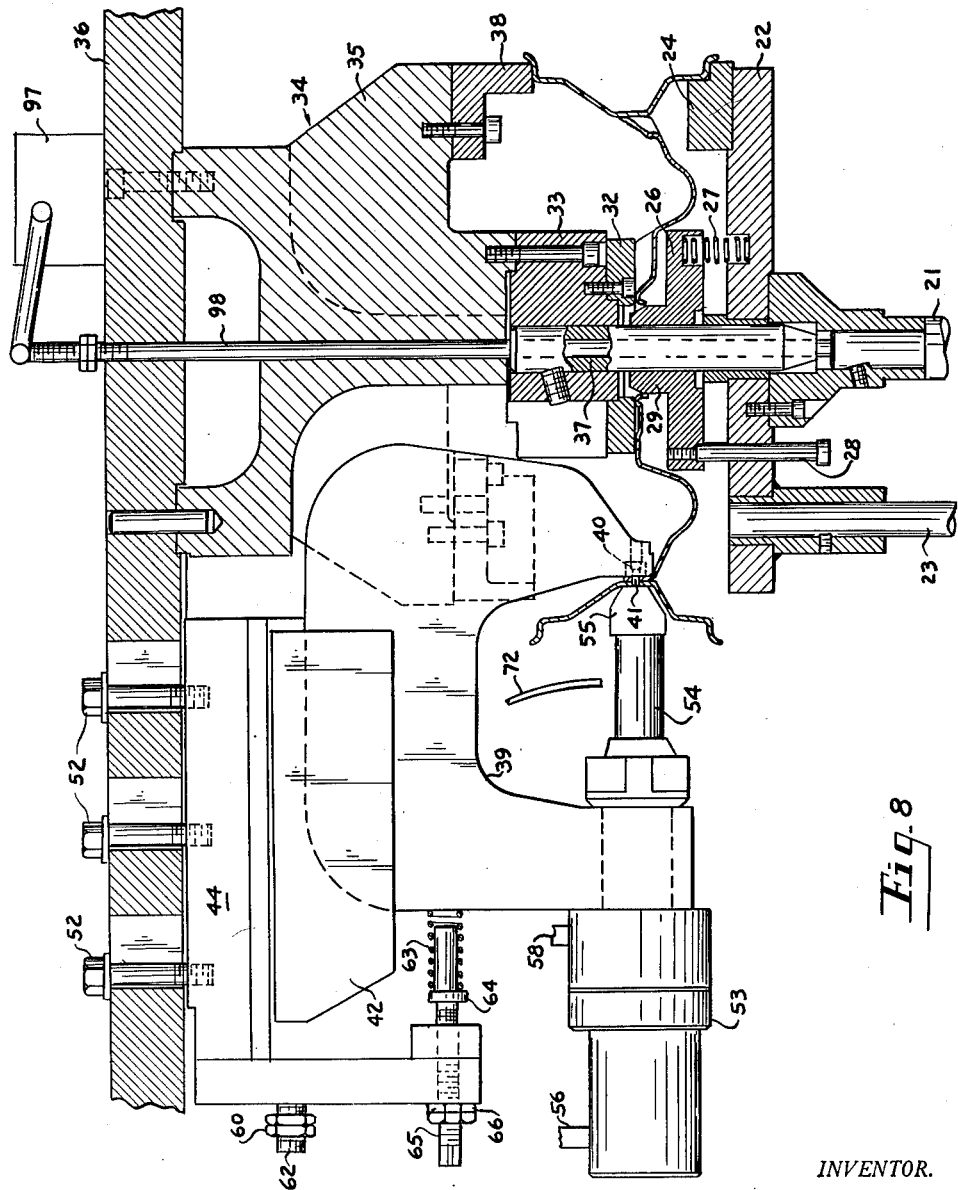
INVENTOR.
FREDERICK P. SHARPE.
BY
ATTORNEYS.

April 29, 1952 F. P. SHARPE 2,594,506
WHEEL ASSEMBLING MACHINE
Filed Oct. 17, 1949 10 Sheets-Sheet 9

INVENTOR.
FREDERICK P. SHARPE.
BY
Whittemore Hulbert & Belknap
ATTORNEYS.

Patented Apr. 29, 1952

2,594,506

UNITED STATES PATENT OFFICE 2,594,506

WHEEL ASSEMBLING MACHINE

Frederick P. Sharpe, Dearborn, Mich., assignor to Kelsey-Hayes Wheel Company, Detroit, Mich., a corporation of Delaware Application October 17, 1949, Serial No. 121,866

13 Claims. (Cl. 164—90)

The invention relates to wheel assembling machines and refers more particularly to machines for assembling tire carrying rims and wheel bodies which when assembled and secured together form vehicle wheels.

The invention has for one of its objects to provide a machine which is designed to receive an initial loose assembly of rim and wheel body, to advance the loose assembly and to then relatively axially move the rim and wheel body into the desired telescopic final assembly relation.

The invention has for another object to provide a machine which is provided with mechanism for piercing the telescoped rim and wheel body to form the holes for receiving the means for securing the rim and wheel body together.

The invention has for still other objects to provide a machine having positioning means engageable with the rim and wheel body to relatively angularly position the same when loosely assembled; to provide a machine having means for centering or axially aligning the rim and wheel body and means for angularly positioning the wheel body while the rim and wheel body are being moved axially relative to each other; to provide a machine having fluid operated opposed anvil and punch means at the radially inner and outer sides of the rim and wheel body constructed to exert balanced or equal pressures on the rim and wheel body whereby distortion or deformation of the rim and wheel body is avoided.

The invention has for a further object to provide a machine which is automatic in operation.

With these and still further objects in view, the invention resides in the novel features of construction and combinations and arrangements of parts as more fully hereinafter set forth.

Figure 1:
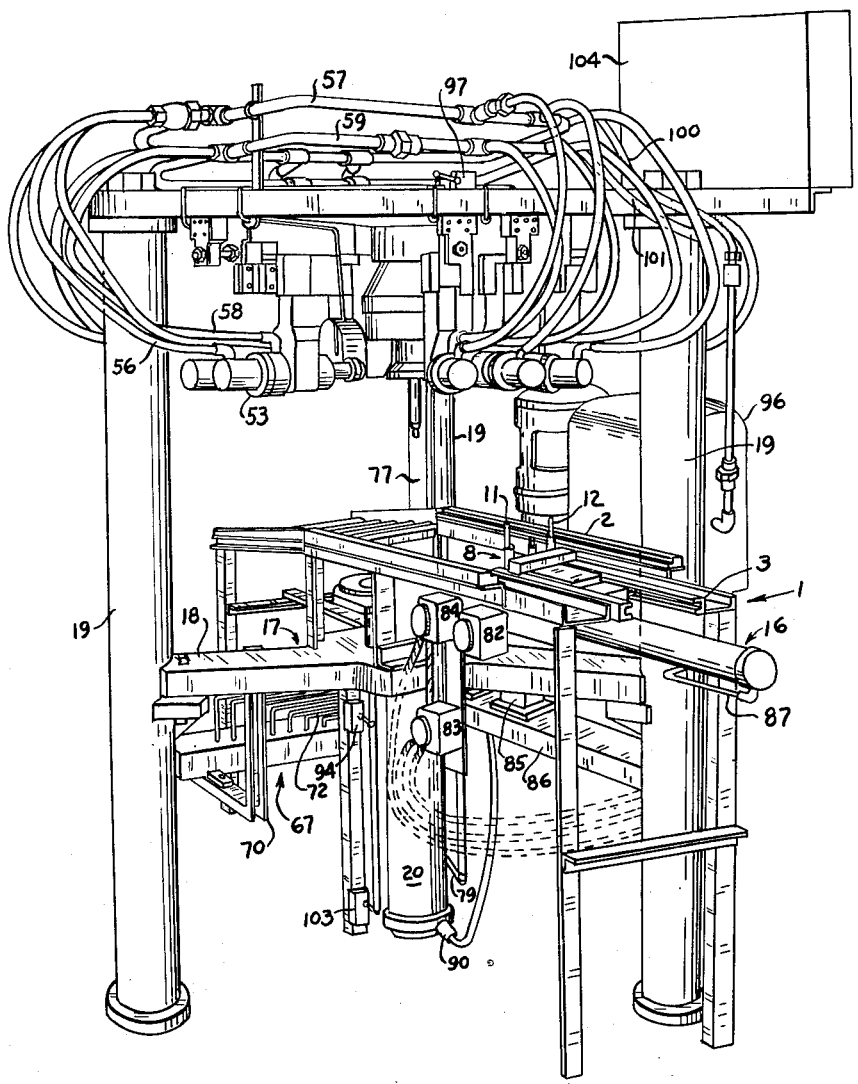
Figure 1 is a perspective view of a wheel assembling machine embodying the invention.
Figure 2:
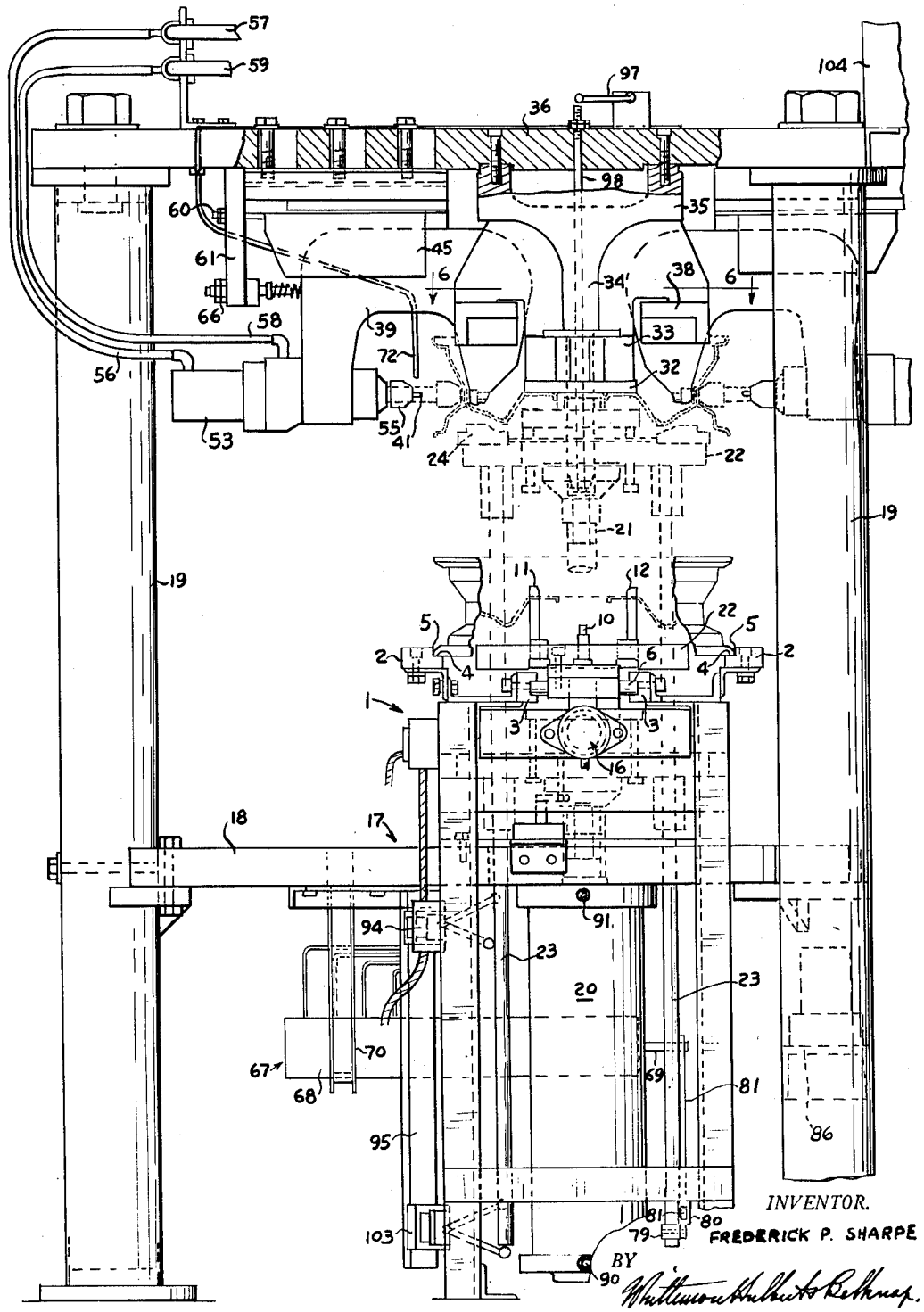
Figure 2 is an end view thereof with parts broken away and in section.
Figure 3:
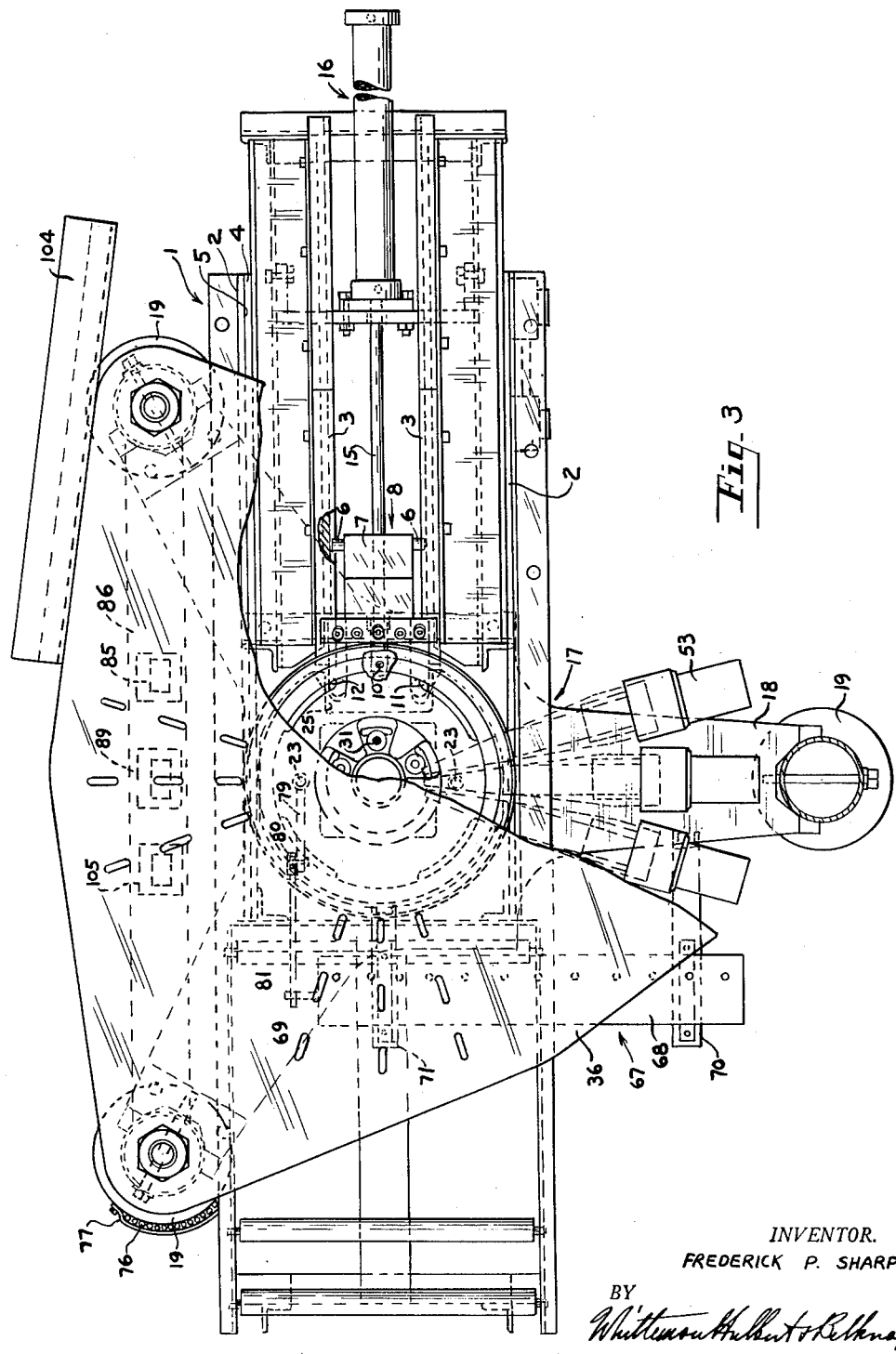
Figure 3 is a top plan view thereof with parts broken away and in section.
Figure 4:
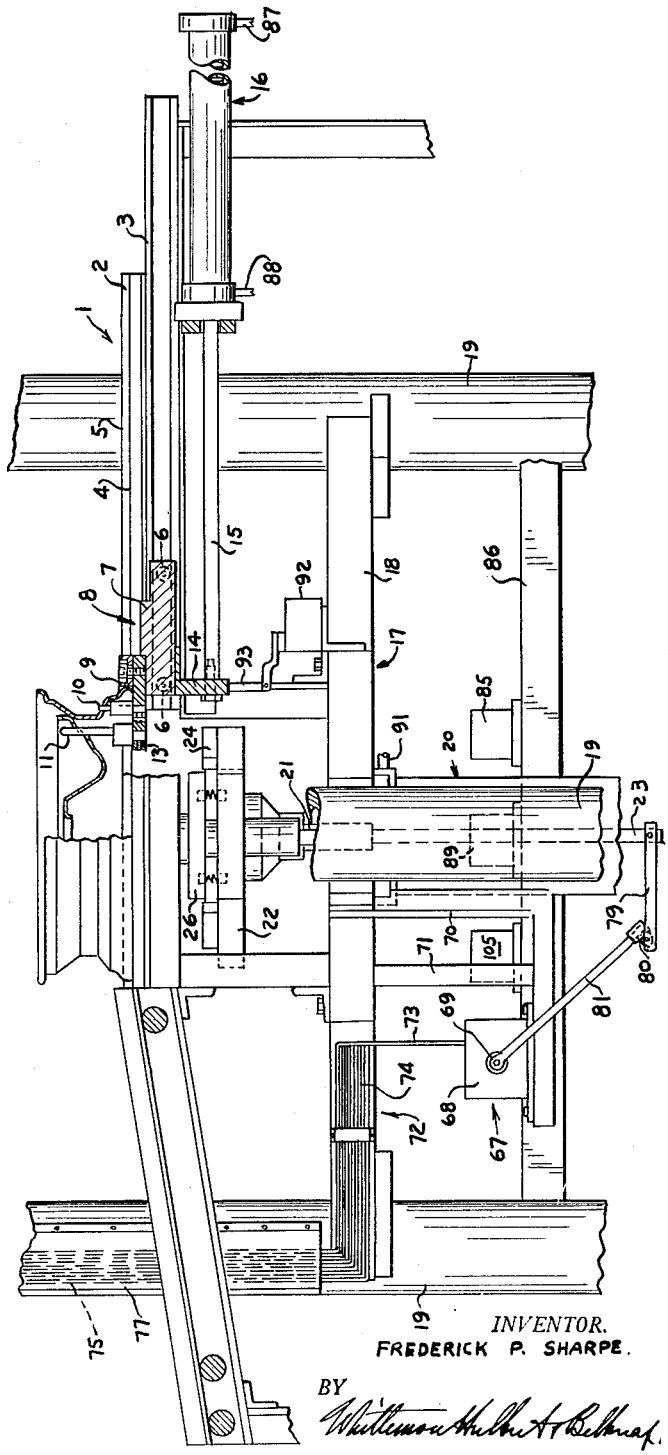
Figure 4 is a side elevation thereof with the upper portion omitted and with parts broken away and in section.
Figure 5:
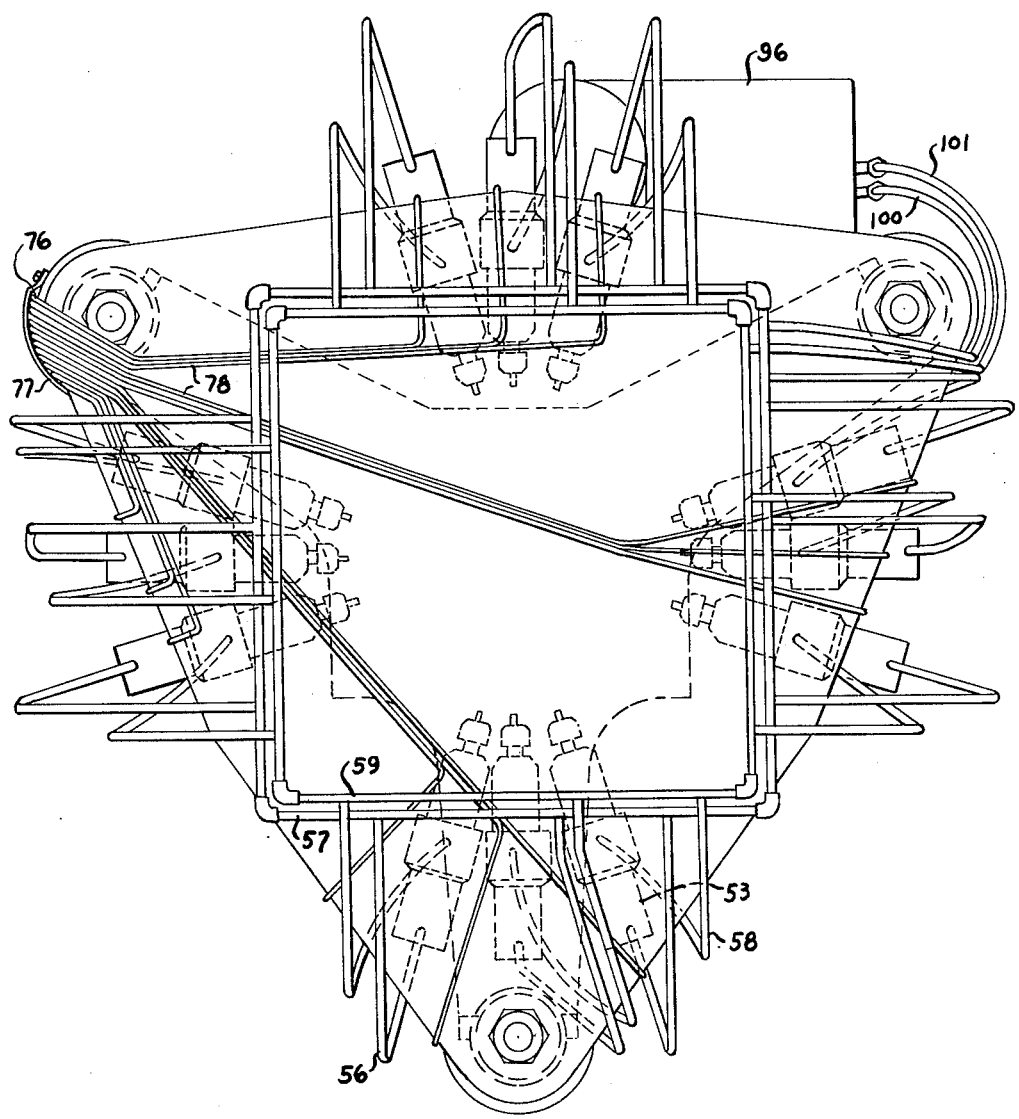
Figure 5 is a top plan view thereof illustrating the hydraulic lines for the piercing units and the lubricating lines for the punches of the piercing units.
Figure 6:
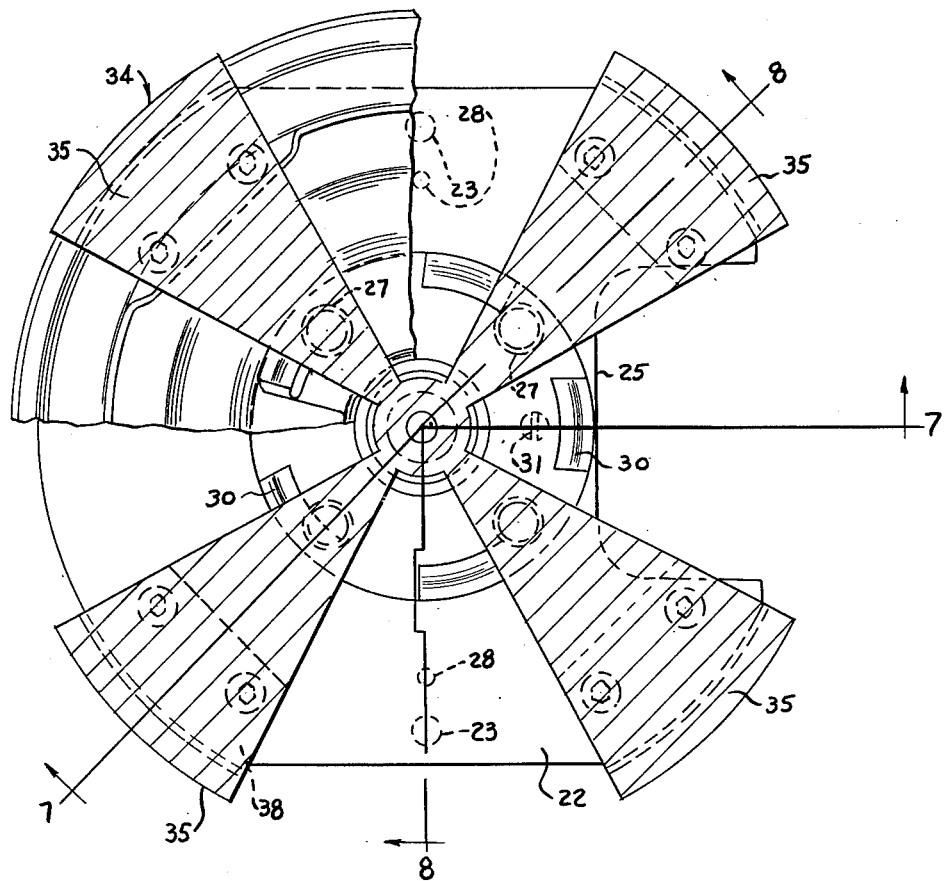
Figure 6 is a cross section on the line 6—6 of Figure 2.
Figure 7:
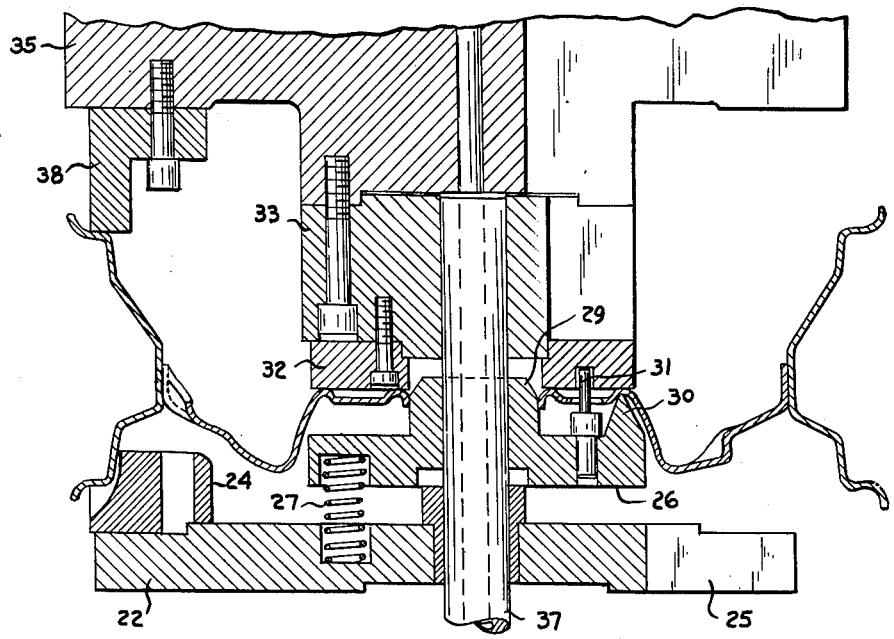
Figure 11:
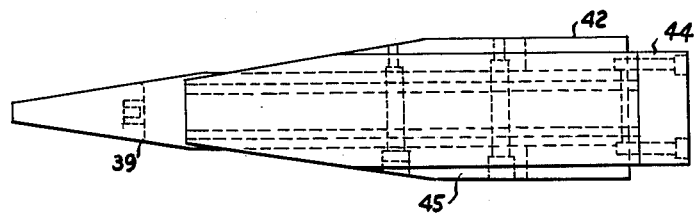
Figure 9:
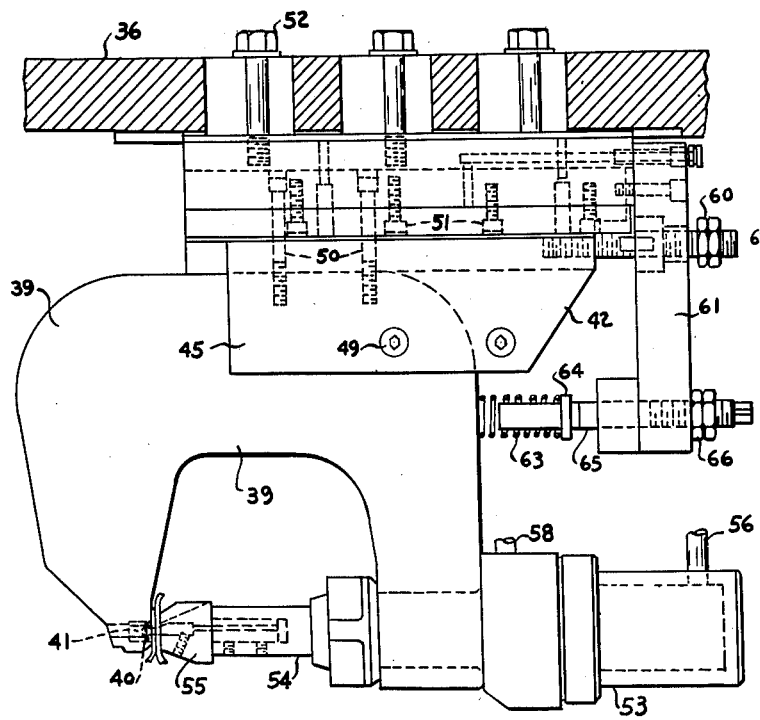
Figure 10:
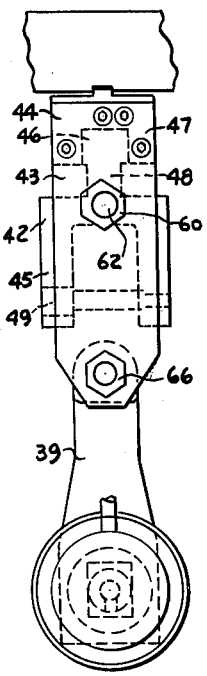
Figure 9A:
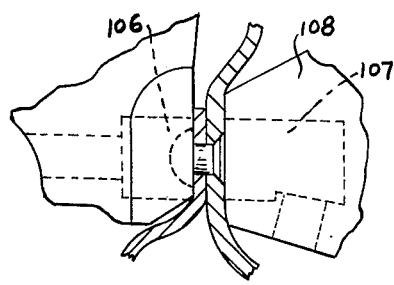
Figure 12:
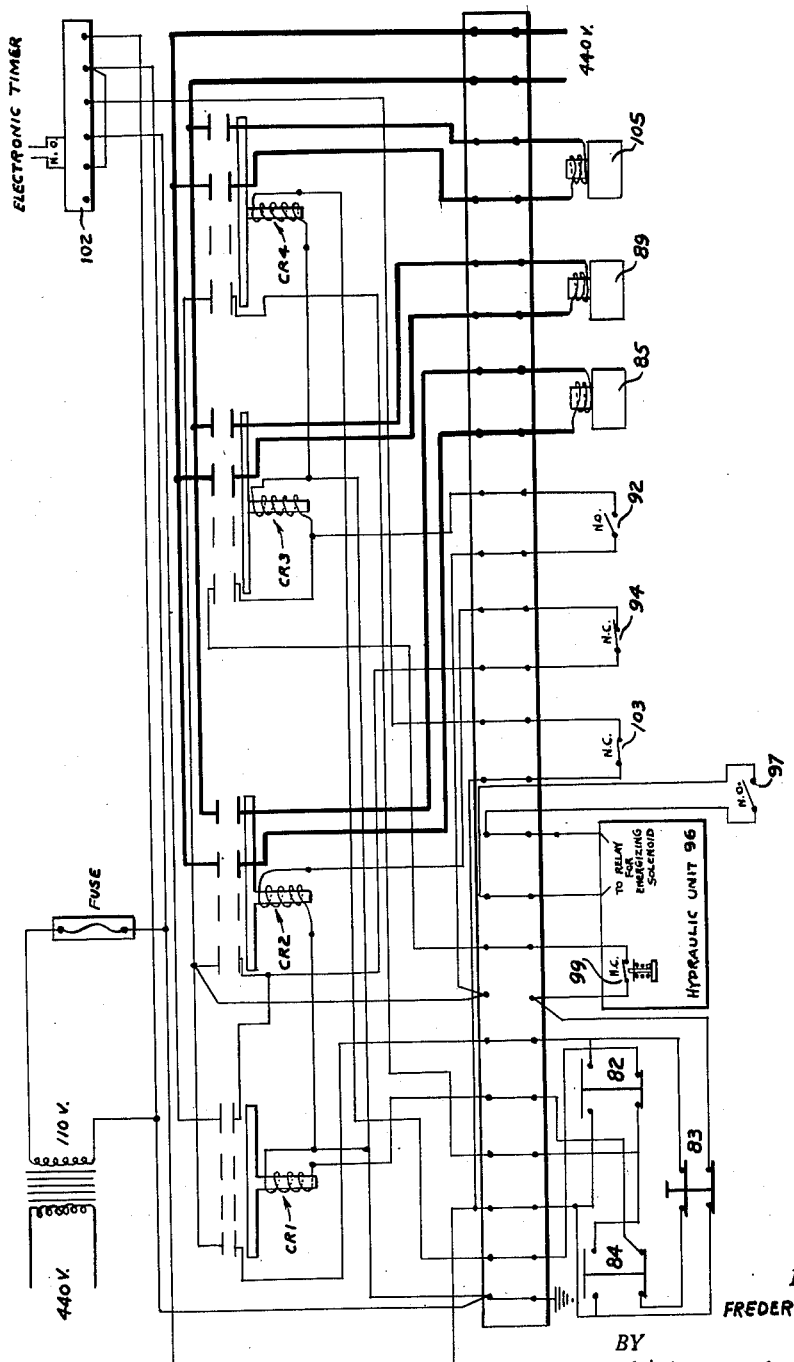

Figures 7 and 8 are cross sections respectively on the lines 7—7 and 8—8 of Figure 6;

Figure 9 is a side elevation of a piercing unit;
Figure 10 is an outer end view thereof;
Figure 11 is a top plan view thereof;
Figure 9A is a view similar to a portion of Figure 9 showing the anvil and punch modified to effecting riveting;
Figure 12 is a wiring diagram.

The machine illustrated in the present instance is designed to assemble a wheel body and a tire carrying rim in predetermined relation to each other and to then form aligned holes in the wheel body and rim to receive means for securing the wheel body and rim together. As illustrated, the wheel body is a spider having a central bolting-on portion, a web and radiating spokes, the web and spokes being peripherally flanged, and the rim is a drop center rim.

The machine has the frame 1 carrying the pair of horizontal parallel rim guides 2 and the pair of horizontal parallel feeding carriage guides 3, the guides 3 being located between and below and extending parallel to the guides 2. The rim guides are rabbeted to provide the horizontal longitudinally extending faces 4 for supporting the rim and the opposed vertical longitudinally extending faces 5 for guiding the rim, the rim being mounted on the guides with its outboard tire retaining flange supported by the faces 4 and guided by the faces 5. The feeding carriage guides are opposed and channel shaped to receive the rollers 6 at the opposite sides of the base 7 of the reciprocable feeding carriage 8. The base has the transverse upright part 9 providing an upright face for engaging the edge of the outboard tire retaining flange of the rim. The base carries in advance thereof the upright positioning pins 10, 11 and 12, the pin 10 being engageable in the valve stem hole of the rim and the pins 11 and 12 being at opposite sides of the pin 10 and being engageable in the spaces between the spider and rim at opposite sides of a spoke of the spider. The construction is such that when the rim is placed upon the rim guides 2 with its outboard tire retaining flange resting on the guides and with its valve stem hole engaged by the pin 10 and the spider is placed upon and partially nested within the rim with the outboard side of the spider facing downwardly and one of the spokes of the spider between the pins 11 and 12, the pins 10, 11 and 12 serve to angularly position the rim and spider with respect to the machine and each other. Also the edge of the outboard tire retaining flange engages the upright face of the transverse part 9 of the base, thereby relieving the pins 10, 11 and 12 from the strain of advancing the rim and spider. The pins 10, 11 and 12 are mounted on the bars 13 which extend forwardly of the carriage and are longitudinally adjustably mounted on its base.

The carriage is adapted to be reciprocated between its loading and raising positions by a conventional or standard air cylinder 16 of that type having a predetermined stroke of piston. More particularly the base 7 of the carriage has secured thereto the depending plate 14 which is connected to the piston rod 15 extending forwardly from the piston. The cylinder extends horizontally midway between the guides 3 and is mounted at its forward end upon one of the cross bars of the frame 1 and has ports at its opposite ends for the passage of compressed air into and from the cylinder to move the piston through a predetermined distance or stroke in opposite directions.

The machine also has the fixed horizontal bottom plate 17 which is formed with the radiating arms 18 secured to the upright posts 19 intermediate their ends and at the sides of the frame 1 between its ends. The bottom plate is located below the guides 2 and 3 and has secured thereto the depending vertical air cylinder 20 of conventional or standard construction and of that type having a predetermined stroke of piston. The cylinder has ports at its upper and lower ends for the passage of compressed air to raise and lower the piston through a predetermined distance or stroke. 21 is the piston rod extending upwardly from the piston through the bottom plate and having secured to its upper end the rim carrying plate 22 to which are secured the diametrically opposite depending guide rods 23 slidably passing through bushings in the bottom plate. The rim carrying plate has peripherally mounted thereon the angularly spaced arcuate abutments 24 in the nature of blocks for engaging the lower face of the outboard tire retaining flange and the radially inner face of the outboard bead seat portion of the rim. The rim carrying plate 22 is formed with the recess 25 which provides clearance for the feeding carriage 8 and more particularly the positioning pins 10, 11 and 12 when the feeding carriage is in its forward or advanced position so that when the rim carrying plate is raised to pass from a position below the feeding carriage to a position above the feeding carriage no interference will occur between the plate and feeding carriage. Also the rim engaging blocks 24 are positioned to clear the rim guides 2 and the feeding carriage 8 during the raising of the rim carrying plate. 26 is the spider carrying plate above and resiliently mounted on the rim carrying plate 22 by the coil springs 27. 28 are studs threaded into the spider carrying plate and passing downwardly through the rim carrying plate and having heads at their lower ends engageable with the lower face of the rim carrying plate to limit the upward movement of the spider carrying plate away from the rim carrying plate under the influence of the coil springs. The spider carrying plate 26 has the upwardly extending axial pilot 29 for engaging the central hub hole of the spider and the upwardly extending angularly spaced arcuate abutments 30 in the nature of projections for engaging the lower faces of the hub flange seating parts of the bolting-on portion of the spider radially outwardly of the bolt holes. Also, the spider carrying plate 26 has the upwardly extending positioning pin 31 for engaging one of the bolt holes of the bolting-on portion of the spider.

To secure the final rim and spider assembly, the rim is moved upwardly over the spider to a predetermined position after a predetermined upward movement of the spider. To limit the upward movement of the spider there is the fixed abutment 32 in the nature of a plate depending from and secured to the spacer body 33 which in turn depends from and is secured to the hub of the body 34 having the radial arms 35 directly above correspondingly positioned radial arms of the spacer body. The body 34 depends from and is secured to the top plate 36 which is generally triangular and mounted on and secured to the upright posts 19. The spacer body, abutment plate and body are in axial alignment and the spacer body has secured thereto the axial pilot tube 37 for slidably engaging the spider carrying plate 26 and a bushing in the rim carrying plate 22 when raised to guide both plates. To limit the upward movement of the rim, there are the fixed angularly spaced arcuate abutments 38 in the nature of blocks secured to the lower faces at the radially outer ends of the radial arms 35 of the body 34. The abutments 38 are located above the abutments 24 and are engageable with the upper face of the inboard tire retaining flange of the rim. The lower faces of the fixed abutments 32 and 38 are spaced apart a predetermined vertical distance to accurately locate the rim and spider axially relative to each other when raised into contact with the abutments.

Assuming the feeding carriage 8 to be in loading position and the mechanism including the rim carrying plate 22, the spider carrying plate 26 and associated parts for raising the rim and spider to be in lowered position and the initial loose assembly of rim and spider to be in place with the rim mounted upon the rim guides 2 and engaging the carriage and the valve stem hole of the rim engaged by the pin 9 and the spider resting upon and partially nested within the rim and one of the spokes of the spider between the pins 10 and 11, the feeding carriage 8 is advanced a predetermined distance when fluid under pressure, such as compressed air, is admitted to the outer end of the air cylinder 16. As a result the initial loose rim and spider assembly is advanced to raising position. When fluid under pressure, such as compressed air, is admitted to the lower end of the air cylinder 20 the piston rod 21 is raised to positively raise the rim carrying plate 22 which in turn resiliently raises the spider carrying plate 26 by means of the coil springs 27. While the plates are being raised the pilot 29 and the positioning pin 31 of the spider carrying plate respectively engage the hub hole of the spider and a bolt hole in the bolting-on portion of the spider and also the projections 30 of the spider carrying plate engage the hub flange seating parts of the bolting-on portion of the spider radially outwardly of the bolt holes. Also during the raising of the plates, the abutment blocks 24 of the rim carrying plate 22 engage the radially inner face of the outboard bead seat portion and the lower face of the outboard tire retaining flange of the rim. As a result both the spider and rim are centered and the spider is angularly positioned. Upon continued raising of the plates the bolting-on portion of the spider engages the fixed abutment 36 and then remains stationary while the rim carrying plate 22 continues to be raised to force the rim upwardly over the spider and against the fixed abutment 32 at which time the peripheral flange at the radially outer ends of the spokes of the spider engages the base of the well of the rim and the spider is correctly positioned axially of the rim and both the rim and spider are in final assembly and piercing position. It will be noted that the coil springs 27 provide for the upward movement of the rim carrying plate 22 relative to the spider carrying plate 26.

The mechanism for piercing the rivet holes in the base of the well of the rim and the peripheral flange at the radially outer ends of the spokes of the spider comprises piercing units each having the yoke 39 and the anvil 40 and the punch 41 carried by the yoke. In the present instance the spider has four spokes and three registering rivet holes are formed in the rim and the peripheral flange at the radially outer end of each spoke so that there are four groups of three piercing units for each spoke with each group of piercing units extending radially of the rim and spider in a space between adjacent radial arms 35 of the body 34. The yoke of each piercing unit is radially slidably carried by the top plate 36 by being fixedly secured to the slide 42 which is radially slidably supported by the gibs 43 secured to the guide 44. The slide 42 has the depending furcations 45 which embrace the upper portion of the yoke, the head 46 which slidably engages the furcations 47 of the guide and the neck 48 of less width than the head 46 and furcations 45 and extending between gibs 43. The lower faces of the head at the opposite sides of the neck slidably engage the inner portions of the upper faces of the gibs. As illustrated the yoke is secured to the slide by the bolts 49 and 50, the gibs are secured to the guide by the bolts 51 and the guide is secured to the top plate by the bolts 52. The holes through the top plate for receiving the bolts 52 are elongated radially or toward the center of the top plate to provide for radially adjustably securing each guide 44 to the top plate.

The arm of each yoke carrying the anvil 40 is positioned to extend radially inside the peripheral flange at the radially outer end of the spoke of the spider when the spider and the rim are in their raised positions against their respective abutments. The other arm of the yoke is positioned to be radially outside of the rim and has secured thereto the radially extending conventional or standard hydraulic cylinder 53. 54 is the piston rod secured at its radially outer end to the piston reciprocable within the cylinder and having secured to its radially inner end the holder 55 for the punch 41. The cylinder is provided at its ends with ports for the passage of a suitable liquid, preferably oil, to and from the opposite ends of the cylinder to thereby reciprocate the piston in both directions. The ports at the radially outer ends of all the cylinders 53 are connected by the pipes 56 to the endless pipe 57 mounted on the top plate 36 and the ports at the radially inner ends of all the cylinders 53 are connected by the pipes 58 to the endless pipe 59 also mounted on the top plate 36.

When the parts of the piercing units are in their normal or inoperative positions both the anvils and punches provide clearance for the spider and rim when being raised or lowered. The normal or inoperative position of each anvil is controlled by abutment of the nut 60 with the plate 61, the nut being threaded upon the stud 62 passing radially through the plate and threaded into the slide 42 and the plate being secured to the radially outer end of the guide 44. The slide 42 and associated yoke 39 are resiliently urged radially inwardly by the coil spring 63 extending radially and abutting the radially outer side of the yoke and the collar 64 upon the stud 65. The stud extends radially through and threadedly engages the lower end of the plate 61 and is locked in adjusted position by the nut 66. The punch 41 is held in its normal radially outer position by the oil under pressure acting upon the radially inner side of the piston within the cylinder 53.

The construction of the piercing mechanism is such that with the parts in their normal or off position a spider and rim may be readily raised between the anvil and punch, 40 and 41 respectively, of each piercing unit. With the spider and rim in raised position and oil under pressure being admitted through the port into the radially outer end of the cylinder 53 of each piercing unit and oil being permitted to flow from the radially inner end of the cylinder, the piston within the cylinder is moved radially inwardly to bring the end of the punch 41 against the base of the well of the rim and the cylinder is moved radially outwardly and with it the yoke 39 and slide 42 to bring the anvil 40 against the radially inner side of the portion of the peripheral flange at the radially outer end of a spoke. Then upon sufficient increase in pressure of the oil in the radially outer end of the cylinder the piston is advanced radially inwardly to force the punch through the rim and spider and pierce the rivet hole. Since the pressure acting upon the radially outer end of the cylinder is the same as the pressure acting upon the outer face of the piston, the pressure exerted by the anvil and the pressure exerted by the punch are balanced or equal so that the rim and spider are not distorted. After this occurs the oil is permitted to escape through the port at the radially outer end of the cylinder and oil under pressure is admitted through the port at the radially inner end of the cylinder and the punch is withdrawn or retracted to its normal or off position and the yoke and anvil are moved radially inwardly by the coil spring 63 to normal or off position.

For the purpose of lubricating the punches 41, the oil pump 67 is provided. This oil pump is of conventional or standard construction and comprises the housing 68 having twelve pump compartments within each of which is located a cam secured to the shaft 69 which extends longitudinally through the housing. The housing is mounted on the L-shaped brackets 70 and 71, the upright portions of which are secured to the bottom plate 17. Each pump compartment has an oil outlet connected to the tube 72 which leads to a point directly above a punch in retracted or normal or off position. The tubes have the parallel portions 73 extending upwardly from the outlets, the parallel portions 74 extending horizontally to the post 19 at the rear side of the machine and nearest the discharge end of the machine, the parallel portions 75 extending upwardly at the side of the post and the parallel portions 76 extending over the edge of the top plate 36. 77 is a shield secured to the post and extending over the upwardly extending portions 75. Inasmuch as there are four groups of three piercing units, the portions 78 of the tubes leading from the portions 76 are arranged in groups of three with each group extending over the top plate 36 to a location above a group of piercing units and then downwardly past the edge of the top plate and terminating at points directly above the punches 41, when in their retracted position.

To operate the oil pump the lower end of the guide rod 23 at the rear side of the machine has secured thereto the arm 79 which has pivotally secured thereto the eye 80 which is slidably engaged by the lever 81 secured to the pump shaft 69. With this construction the shaft 69 will be oscillated during the operation of the machine and more particularly during the raising and lowering of the mechanism for raising and lowering the rim and spider. During the lowering movement, a limited amount of oil, preferably one drop, which is dependent on the capacity of the oil pump, is forced through the tubes and discharged on to the punches which are in retracted position.

To control the operation of the machine, the start switch 82, the stop switch 83 and the emergency stop switch 84 are provided, each being operable by push button backed by a spring opposing manual operation. The switches are conventional or standard and mounted on the frame 1 at its front side and loading end. The start switch 82 initiates the operation of the valve and solenoid unit 85 which controls the operation of the air cylinder 16. The unit is mounted on the bar 86 extending between and secured to the two posts 19 at the rear side of the machine. The valve and solenoid unit is conventional or standard and in general comprises a valve, a solenoid for moving the valve in one direction and a spring for returning the valve to its original position. The valve is a four-way valve having one port connected to a pipe for supplying fluid under pressure, such as compressed air, a second port opening to atmosphere and a third port and a fourth port connected by the pipes 87 and 88 respectively to the outer and inner ends of the cylinder 16. By pushing the button of the start switch the solenoid is energized to operate the valve to allow compressed air to flow through the pipe 87 to the outer end of the cylinder 16 to advance the piston rod 15 and the carriage 8. At the same time the valve allows air to discharge from the inner end of the cylinder 16 through the pipe 88 to the atmosphere.

To control the operation of the air cylinder 20, the valve and solenoid unit 89 is provided, it being mounted on the bar 86. The unit 89 is the same as the unit 85 with the valve having one port connected to the above mentioned pipe for supplying compressed air, a second port opening to atmosphere and a third port and a fourth port connected by the pipes 90 and 91 respectively to the lower and upper ends of the cylinder 20. To initiate the operation of the unit 89 there is the limit switch 92 mounted on the bottom plate 17. The limit switch is conventional or standard and in general comprises a movable contact, a stationary contact, a swingable arm for moving the movable contact into engagement with the stationary contact and a spring for normally holding the movable contact away from the stationary contact. The limit switch is normally open and located so that its arm extends into the path of travel of the pin 93 which depends from the base 7 of the carriage and engages the arm during the final portion of the advance of the carriage. As a result, the depending pin swings the arm to close the switch 92 and energize the solenoid of the unit 89 which moves the valve to allow compressed air to flow through the pipe 90 to the lower end of the cylinder 20 and to allow air to discharge from the upper end of the cylinder 20 through the pipe 91 to the atmosphere. The rim carrying plate 22 and the spider carrying plate 26 are then raised and raise the rim and spider.

To return the carriage 8 to its loading position after the rim and spider carrying plates have been moved upwardly sufficiently to raise the rim and spider above the position pins 10, 11 and 12 to clear the same, there is the limit switch 94 mounted on the bar 95 depending from the bottom plate 17. The limit switch 94 is the same as the limit switch 92 and is located so that its arm extends into the path of travel of the guide rod 23 at the front side of the machine and the guide rod holds the arm down and the limit switch closed until the rim and spider have been raised sufficiently to clear the positioning pins 10, 11 and 12 after which the guide rod clears the arm of the limit switch and allows it to be opened by its spring. As a result de-energization of the solenoid of the unit 85 takes place and the spring of this unit returns the valve to its original position at which time compressed air is allowed to flow through the pipe 88 to the inner end of the air cylinder 16 and air is allowed to flow from the outer end of the cylinder through the pipe 87 to the atmosphere, thus returning the carriage 8 to its starting or loading position.

To control the operation of the piercing units the hydraulic unit 96 is provided at the rear side of the machine and the limit switch 97 is provided to control operation of the hydraulic unit. The limit switch 97 is of the same construction as the limit switches 92 and 94 and is normally open and mounted on the top plate 36 with its arm in the path of travel of the push rod 98. This rod extends axially through the body 34 and the pilot tube 37 and is engageable with the piston rod 21 during the final portion of its upward movement. The push rod upon engaging the arm of the limit switch 97 swings the same to close the limit switch which effects the opening of a by-pass valve in the hydraulic unit. The hydraulic unit is a hydraulic power generator and is conventional or standard and in general comprises an electric motor which operates continuously during the operation of the machine, suitable manually operable switch means being provided to start and stop the electric motor. The hydraulic unit also comprises an oil pump driven by the motor, a valve assembly, an oil pressure intensifier, the above mentioned by-pass valve between the pump and valve assembly, a solenoid for operating the by-pass valve and a relay in the circuit including the limit switch 97 for energizing the solenoid. The hydraulic unit also comprises a limit switch 99 for controlling the lowering of the final rim and spider assembly after the piercing has been carried out. The limit switch 99 is a micro switch of conventional or standard construction with its contacts normally in engagement so that the switch is normally closed. The hydraulic unit further comprises a spring loaded plunger which is moved by the oil against the resistance exerted by the spring into engagement with the arm of the switch 99 to swing the same and disengage the movable contact from the stationary contact thereby opening the switch. The solenoid for operating the by-pass valve is in a 440 volt circuit while the limit switch 97 and the relay for energizing the solenoid are in a 28 volt circuit. The valve assembly comprises plungers or valves operated by the oil when the by-pass valve is opened and oil passageways controlled by the plungers or valves and communicating at different times during the operation of the hydraulic unit with the pipes 100 and 101 which are connected to the endless pipes 57 and 59.

When the limit switch 97 is closed by the push rod 98 the by-pass valve of the hydraulic unit is opened and the valve assembly of the unit operates to connect the radially outer ends of the cylinders 53 to the oil pump to move the punches 41 and the anvils 40 respectively against the rim and the peripheral flange at the radially outer ends of the spokes of the spider. Then the intensifier operates and the oil pressure in the radially outer ends of the cylinders is increased and the punches effect the piercing after which the valve assembly operates to connect the radially inner ends of the cylinders to the oil pump and the oil and springs 63 return the punches and anvils to their normal or off positions. After this occurs, the oil pressure on the spring loaded plunger builds up and overcomes the force exerted by the plunger loading spring moving the plunger against the arm of the limit switch 99 and opening the switch. The opening of the switch effects the de-energizing of the solenoid of the unit 89 allowing the valve of this unit to return to its original position at which time compressed air is allowed to flow through the pipe 91 to the upper end of the air cylinder 20 and air is allowed to flow from the lower end of the cylinder to the atmosphere, thus returning the rim and spider carrying plates to their lowermost positions and depositing the rim upon the guides 2. The pierced assembly of rim and spider may be advanced and discharged from the machine by the rim of the next initial loose rim and spider assembly when advanced during the next cycle of operations.

To control the time interval during which the carriage 8 remains in loading position the electronic timer 102 and the limit switch 103 are provided. The electronic timer 102 is conventional or standard and located in the panel box 104 along with the wiring circuits shown in Figure 12. The box is mounted upon the top plate 36 at the rear side of the machine. The limit switch 103 is of the same construction as the limit switches previously mentioned and is mounted on the bar 95 so that its arm extends into the path of the guide rod at the front side of the machine and is engaged by the guide rod during the final portion of its downward movement and swung downwardly thereby closing the limit switch and energizing the electronic timer. The electronic timer in turn controls the timing of the energizing of the solenoid of the solenoid and valve unit 85.

The emergency stop switch 84 initiates the operation of the valve and solenoid unit 105 which is mounted on the bar 86. This assembly is conventional or standard and in general comprises a valve, a solenoid for moving the valve in one direction and a spring for returning the valve to its original position. The valve is a three way valve having one port connected to the compressed air supply pipe for the valves of the units 85 and 89, a second port connected to the radially outer end of the air cylinder 16 and the lower end of the air cylinder 20 and a third port connected to the other ends of the air cylinders. By pushing the button of the emergency stop switch, the solenoid of the unit 105 is energized and the solenoid operates the valve to equalize the pressure of air at both sides of the pistons of the two air cylinders so that their operation immediately stops.

The various parts described as conventional or standard or of conventional or standard construction may be bought in the open market and usually are made by more than one manufacturer.

The limit switches 92, 94, 99 and 103 are in 110 volt circuits while the solenoids of the units 85, 89 and 105 are in 440 volt circuits.

To initiate the operation of the machine, assuming the electric motor of the hydraulic unit 96 to be operating, the operator pushes the button of the start switch 82 to close the same. Closing the start switch completes the electrical circuit to the relay CR1 which shunts the start switch and holds the control circuit closed after the start switch is opened or released by the operator. Also, closing of the relay CR1 completes a circuit to the electronic timer 102 and initiates operation of this timer. The timer completes a circuit to the relay CR2 and closes the latter to energize the solenoid of the unit 85.

Energization of the solenoid operates the four-way valve of the unit 85 to admit air under pressure into the cylinder 16 at the outer side of the piston in this cylinder and to connect the cylinder at the inner side of the piston to the exhaust. Thus the piston in the cylinder 16 is moved inwardly and the carriage 8 is advanced by the piston to its innermost position at which time the initial loose assembly of rim and spider is in raising position.

As the carriage approaches its advanced or innermost position the limit switch 92 is operated by the pin 93 of the carriage and the limit switch is closed to in turn close the relay CR3. Closing of the relay CR3 energizes the solenoid of the unit 89 and operates a holding circuit which shunts the limit switch 92 in order to maintain the relay closed after the limit switch 92 is opened.

Energization of the solenoid of the unit 89 operates the four-way valve of the same unit to connect the lower end of the cylinder 20 to the source of air under pressure and to connect the upper end of the cylinder 20 to the exhaust. As a result the piston in the cylinder 20 is moved upwardly and the rim and spider raising plates are elevated to lift the rim and spider. Upon initial upward movement of the raising plates the circuit to the electronic timer 102 is opened by the normally closed limit switch 103 positioned to be cleared by the rod 23 at the front side of the machine and allowed to open.

After the rim and spider raising plates are moved upwardly sufficiently to clear the rim and spider from the positioning pins on the carriage, the limit switch 94 is cleared by the rod 23 and allowed to open. Opening of the limit switch 94 breaks the circuit to the relay CR2 and de-energizes the solenoid of the unit 85. De-energization of the solenoid enables the four-way valve of the same unit to move to a position wherein the inner end of the cylinder 16 is connected to the source of air under pressure and the outer end of the cylinder 16 is connected to the exhaust. Accordingly the piston in the cylinder 16 is moved outwardly and the carriage is returned to its loading position, nevertheless the circuit to the solenoid of the unit 89 is maintained closed by the holding relay CR3.

It follows from the above that the rim and spider raising mechanism continues its upward movement as the carriage is returned to its loading position and eventually locates the rim and spider in their elevated positions where they are in operative relation to the anvils 40 and the piercing punches 41. As the work raising mechanism approaches its uppermost position the normally open limit switch 97 is engaged thereby and is closed. Closing of the limit switch 97 completes the circuit of the solenoid relay in the hydraulic unit 96 and energizes the solenoid of the hydraulic unit to operate the by-pass valve in the hydraulic unit.

As stated above, the hydraulic unit supplies hydraulic fluid medium to the outer ends of the hydraulic cylinders 53 to move the punches 41 inwardly toward the anvils 40 and the anvils outwardly toward the punches to thereby clamp the rim and spider between the anvils and the inner ends of the punches. Upon completion of the clamping operation the hydraulic pressure is intensified by the hydraulic unit sufficiently to enable the punches to pierce the rim and spider. Then the hydraulic unit supplies hydraulic fluid medium to the inner ends of the hydraulic cylinders 53 allowing the hydraulic fluid medium to flow from the outer ends of the hydraulic cylinders and the springs 63 operate to return the anvils and punches to their original positions. After the anvils and punches have been returned to their original positions, hydraulic pressure acting on the plunger for operating the limit switch 99 continues to rise and overcomes the plunger loading spring so that the plunger automatically opens the limit switch. Opening of the limit switch 99 breaks the circuit to the relay CR3 and de-energizes the solenoid of the unit 89. De-energization of the solenoid enables movement of the valve of the same unit to connect the upper end of the cylinder 20 to the source of air under pressure and the lower end of the cylinder to atmospheric pressure. Thus the piston in the cylinder 20 is moved downward and the work raising mechanism is lowered to its initial starting position.

As the work raising mechanism is lowered the rod 23 contacts the limit switch 94 and again closes the same. Also as the work raising mechanism approaches its lowermost position the rod 23 closes the limit switch 103 and the electronic timer 102 is again energized to repeat the cycle of operation by closing the relay CR2. The electronic timer is of course adjustable to enable obtaining any required time lag between closing of the switch 103 and operation of the relay CR2. Thus the time available for loading the carriage may be varied to suit different conditions.

The stop switch 83 is electrically connected in circuit with the relays CR1, CR2 and CR3 in a manner such that opening of the stop switch de-energizes all three of these relays. As a result operation of the machine may be discontinued by merely pushing the button of the stop switch and opening the stop switch.

In the event it is desired to make an emergency stop of the mechanism at any point in the cycle of operation, the emergency stop switch 84 is operated by pushing its button. Operation of the switch opens the starting switch holding relay CR1 and closes relay CR4. Closing of relay CR4 energizes the solenoid of the unit 105 and operates the three-way valve of this unit to connect the opposite ends of both cylinders 16 and 20 to the same source of compressed air. As a result the pistons of both cylinders immediately come to rest regardless of their respective positions in the cycle. It will also be noted that opening of the relay CR1 breaks the circuit including the solenoid of the hydraulic unit 96 to stop operation of the hydraulic unit. The relay CR4 is opened and the solenoid of the unit 105 is accordingly de-energized by again pushing the button of the starting switch.

The mechanism for riveting the rim and spider together is the same as the piercing mechanism with the exception that the anvil 106 and the punch 107 of each riveting unit shown in Figure 9A differ from the anvil and punch respectively of each piercing unit. The punch is shaped to engage the end of the head of the rivet which is inserted radially inwardly into the pierced holes in the rim and the peripheral flange at the radially outer end of the spoke. Also, the punch and its holder 108 are shaped to engage the radially outer side of the base of the well of the rim. The anvil is shaped to engage and head over the projecting portion of the shank of the rivet and to engage the radially inner side of the portion of the peripheral spoke flange through which the rivet extends. The remainder of the construction of riveting unit being the same as that of the piercing unit, it will be seen that when oil is admitted under pressure to the radially outer end of the hydraulic cylinder of the riveting unit the oil acts upon both the anvil and the punch to move the same toward each other and into engagement with the rivet shank and the rim well base and the anvil and punch exert balanced or equal opposed pressures while the heading of the rivet shank and the securing of the rim and spider in tight engagement are being effected.

What I claim as my invention is:

1. A machine for assembling a rim and wheel body comprising guides for a loose assembly of rim and wheel body with the wheel body resting on the rim, said guides being engageable with the rim, a feeding carriage reciprocable in a path parallel to said guides, means on said carriage engageable with the rim and wheel body to angularly position the same with respect to each other and said guides, means extending transversely of said guides comprising members engageable with the rim and wheel body and movable transversely of said guides for axially moving the rim and wheel body out of engagement with said positioning means and relatively axially moving the rim over the wheel body to form the final assembly of rim and wheel body, said members having means engageable with the rim and wheel body for centering the same and means engageable with the wheel body for angularly positioning the same.

2. A machine for assembling a rim and wheel body comprising guides for a loose assembly of rim and wheel body with the wheel body resting on the rim, said guides being engageable with the rim, a feeding carriage reciprocable in a path parallel to said guides, means on said carriage engageable with the rim and wheel body to angularly position the same with respect to each other and said guides and means extending transversely of said guides comprising members movable transversely of said guides and engageable with the rim and wheel body for axially moving the same out of engagement with said positioning means and relatively axially moving said rim over said wheel body to form the final assembly of rim and wheel body.

3. A machine for assembling a rim and wheel body spider having a central bolting-on portion, a web, and radiating peripherally flanged spokes comprising guides for a loose assembly of rim and spider with the spider resting on the rim, said guides being engageable with the rim, a feeding carriage reciprocable in a path parallel to said guides, positioning pins on said carriage engageable with the valve stem hole of the rim and opposite sides of a spoke of the spider to angularly position the rim and spider with respect to each other and said guides and means extending transversely of said guides comprising a rim carrying member and a spider carrying member movable transversely of said guides for axially moving the rim and spider out of engagement with said positioning pins and relatively axially moving the rim over the peripherally flanged ends of the spokes of the spider to form the final assembly of rim and spider, said rim carrying member having abutment members engageable with the rim to center the same and said spider carrying member having a pilot engageable in the hub hole of the spider for centering the spider and a pin engageable in a bolt hole of the spider to angularly position the same.

4. A machine for assembling a rim and wheel body comprising horizontal guides for a loose assembly of rim and wheel body with the wheel body resting on the rim, said guides being engageable with the rim, a feeding carriage having means engageable with the rim and wheel body to angularly position the same with respect to each other and said guides, vertically movable means for axially moving the rim and wheel body upwardly out of engagement with said positioning means and abutments engageable by the rim and wheel body during the upward movement thereof, said abutments being positioned with respect to each other to first limit the upward movement of the wheel body and then limit the upward movement of the rim whereby the rim is moved upwardly over the wheel body.

5. A machine for assembling a rim and wheel body spider having a central bolting-on portion, a web, and radiating peripherally flanged spokes comprising horizontal guides for a loose assembly of rim and spider with the spider resting on the rim, said guides being engageable with the rim, a feeding carriage reciprocable in a path parallel to said guides, upright positioning pins on said carriage engageable with the valve stem hole of the rim and opposite sides of a spoke of the spider to angularly position the rim and spider with respect to each other and said guides, and means for moving the rim over the spider to engage the rim with the peripherally flanged ends of the spokes of the spider, said means comprising a member movable upwardly between said guides and having blocks engageable with the radially inner and lower sides of the rim to raise the same out of engagement with the valve hole positioning pin, and a second member resiliently mounted on and movable upwardly by said first member having a pilot engageable with the hub hole of the spider, an upwardly extending positioning pin engageable in a bolt hole of the bolting-on portion of the spider and upwardly extending abutment members engageable with a portion of the bolting-on portion adjacent the bolt holes, a stationary abutment member engageable with the bolting-on portion of the spider during the upward movement of the latter and abutment means predeterminedly vertically spaced relative to said last mentioned abutment member engageable with the rim after the spider engages said abutment member and the rim is predeterminedly moved upwardly relative to the spider to overlie the peripherally flanged ends of the spokes of the spider.

6. A machine for assembling a rim and wheel body spider having peripherally flanged spokes comprising horizontal guides for a loose assembly of rim and spider with the spider resting on the rim, said guides being engageable with the rim, a feeding carriage reciprocable in a path parallel to said guides for advancing the loose assembly of rim and spider along said guides, means on said feeding carriage engageable with the rim and spider to angularly position the same with respect to each other and said guides, means engageable with the rim and spider in advanced position for moving the same upwardly and relatively moving the rim over the spider to engage the rim with the peripherally flanged ends of the spokes to complete the final assembly of rim and spider and means in predetermined angular relation to said rim and spider angular positioning means for forming aligned holes in the rim and peripherally flanged ends of the spokes while the rim and spider are in raised position.

7. A machine for assemblying a rim and wheel body spider comprising horizontal guides for a loose assembly of rim and spider with the spider resting on the rim, said guides being engageable with the rim, a feeding carriage for advancing the rim and spider of the loose assembly along said guides, means on said feeding carriage engageable with the rim and spider to angularly position the same with respect to each other and said guides, means having a predetermined angular relation to said first mentioned means and movable vertically between the guides and engageable with the rim and spider in advanced position to move the same upwardly, said means centering the rim and spider and angularly positioning the spider, stationary abutments engageable with the rim and spider during the upward movement thereof to position the rim and spider with the rim extending over the spider and means having a predetermined angular relation to said last mentioned means and movable radially of the rim and spider when engaging said fixed abutments for piercing the rim and spider.

8. Mechanism for operating upon a rim and wheel body spider having overlying portions comprising piercing units each having an anvil and a punch in axial alignment and located respectively at the radially inner and radially outer sides of the overlying portions, and means for normally holding said anvil and punch respectively in their radially inner and radially outer positions, and means for lubricating the punch of each unit comprising a pump operable to discharge lubricant when the punch is in its radially inner position and a tube leading from said pump to a position above the punch in its radially inner position.

9. In a machine for assembling a rim and wheel body spider, mechanism for axially moving the rim over the spider and positioning the rim relative to the spider so that the rim and spider have overlying portions, and mechanism for piercing the overlying portions comprising piercing units each having an anvil and a punch movable radially of the rim and spider into engagement with an overlying portion from a normal position providing for the passage therebetween of the overlying portion, and means for lubricating the punch of each piercing unit comprising a pump operated by said mechanism for axially moving the rim over the spider and a tube leading from said pump to a position above the punch in its normal position.

10. A machine for assembling a rim and wheel body spider having peripherally flanged spokes comprising a vertically movable member for carrying the rim, a second member resiliently mounted on said first mentioned member for carrying the spider loosely assembled with the rim, fixed abutments for limiting the upward movement of the rim and spider comprising a member engageable with the spider and a member subsequently engageable with the rim whereby the rim is moved upwardly over the spider to engage the rim with the peripherally flanged ends of the spokes, means upon one of said members for angularly positioning the spider and means for piercing the rim and peripherally flanged ends of the spokes when the rim and spider are in contact with their respective abutments, said means comprising piercing units in predetermined angular relation to said angular positioning means and extending radially of the rim and spider with each unit having an anvil and a punch movable toward and away from each other and the rim and spider.

11. A machine for assembling a rim and wheel body spider having a central bolting-on portion, a web and radiating peripherally flanged spokes comprising an upwardly movable member having blocks engageable with the radially inner and lower sides of the rim to raise the rim and a second member resiliently mounted on and movable upwardly by said first mentioned member having a pilot engageable with the hub hole of the spider, and upwardly extending positioning pin engageable in a bolt hole of the bolting-on portion of the spider, an upwardly extending abutment member engageable with a portion of the bolting-on portion adjacent the bolt holes, a stationary abutment member engageable with the bolting-on portion of the spider during the upward movement of the latter and abutment means predeterminedly vertically spaced relative to said last mentioned abutment member engageable with the rim after the spider engages said abutment member and the rim is predeterminedly moved upwardly relative to the spider to overlie the peripherally flanged ends of the spokes of the spider.

12. Mechanism for operating upon a rim and wheel body spider having peripherally flanged spokes comprising a supporting member, a yoke depending from and movably supported by said supporting member and having depending arms, an anvil on one arm of said yoke, a cylinder on the other arm of said yoke, a piston reciprocable within said cylinder, a punch in axial alignment with said anvil and carried by said piston and means for raising the rim and the spider, said means having a predetermined angular relation to said yoke and locating the overlying portions of the rim and spider between said anvil and punch.

13. Mechanism for operating upon a rim and wheel body spider having overlying portions comprising a supporting member, a yoke depending from and supported by said supporting member and having depending arms, an anvil on one arm of said yoke, a cylinder on the other arm of said yoke having ports at its opposite ends for passage of fluid under pressure, a piston reciprocable within said cylinder, a punch in axial alignment with said anvil and carried by said piston and means for raising the rim and the spider and locating the overlying portions thereof between said anvil and punch.

FREDERICK P. SHARPE.

REFERENCES CITED

The following references are of record in the file of this patent:

UNITED STATES PATENTS

| Number | Name | Date |
|---|---|---|
| 1,444,909 | Hail | Feb. 13, 1923 |
| 1,875,448 | Hanna | Sept. 6, 1932 |
| 1,930,258 | Tormyn et al. | Oct. 10, 1933 |
| 1,995,486 | Tormyn et al. | Mar. 26, 1935 |
| 2,202,894 | Bihler | June 4, 1940 |